US000001528H

United States Statutory Invention Registration [19]

[11] Reg. Number: H1528

[45] Published: May 7, 1996

McCord et al.

[54] HYDROPHONE PREAMPLIFIER CONTROL UNIT

[75] Inventors: Michael T. McCord; Larry E. Ivey, both of Orlando, Fla.

[73] Assignee: United States of America, Washington, D.C.

[21] Appl. No.: 393,794

[22] Filed: Feb. 24, 1995

[51] Int. Cl.[6] ..... H04B 17/00

[52] U.S. Cl. ..... 367/13; 367/135

[58] Field of Search ..... 367/135, 13

*Primary Examiner*—Daniel T. Pihulic

*Attorney, Agent, or Firm*—Thomas E. McDonnell; Charles J. Stockstill

[57] ABSTRACT

A hydrophone preamplifier control unit provides for front panel controls and cable connectors for applying a calibration current and operating voltage to the hydrophone, controlling the level of these voltages, and monitoring the operation of the hydrophone. The control unit assures the continuity of the electrical circuits to a hydrophone through the use of a calibration current applied to the hydrophone through the use of a calibration current applied to the hydrophone through an interconnecting cable.

4 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HYDROPHONE PREAMPLIFIER CONTROL UNIT

HYDROPHONE PREAMPLIFIER CONTROL UNIT

BACKGROUND OF THE INVENTION

1. Field of the Invention

This invention deals generally with a hydrophone interface device, more specifically a device for controlling the preamplifier in a hydrophone.

2. Description of Related Art

Standard hydrophones are utilized to calibrate various hydrophone devices each used develops their own methods for providing the direct current (DC) power required to operate the hydrophone, inserting the calibration signals, and the preamplifier interface connections. As a result, the hydrophone cables are frequently modified from user to user to meet that particular user's connector requirements. As the hydrophones are passed from user to user these field connections are often a source of noise, faulty calibration check, or outright failure. Therefore, after each use significant cable servicing is needed prior to their being reused. Often the electronics are damaged due to incorrect operation or connection.

SUMMARY OF THE INVENTION

The objective of this invention is to provide a standard device for controlling a hydrophone that will allow a standard operation and use of the hydrophone between users.

Another object of the invention is to provide a device that is easy to connect and use without damage to the hydrophone mechanical or electronic components.

The objectives of this invention are met by a device that provides all connections necessary to properly use and operate a hydrophone. The standard control unit provides a single direct connection to the hydrophone through a single cable and contains built-in calibration circuitry. The calibration circuitry enables the user to test the hydrophone for correct connectivity and gain. An applied calibration voltage is converted in an alternating current pump circuit into a current signal to be applied to the hydrophone through a wire in the connecting cable between the control unit and the hydrophone. Inside of the hydrophone preamplifier, the calibration current develops a voltage that is applied to a sensor and an amplifier circuit to provide a loop-back system check. From the control unit the gain of the preamplifier may be set to a high or low gain position.

DESCRIPTION OF THE PREFERRED EMBODIMENT

Figure 1:
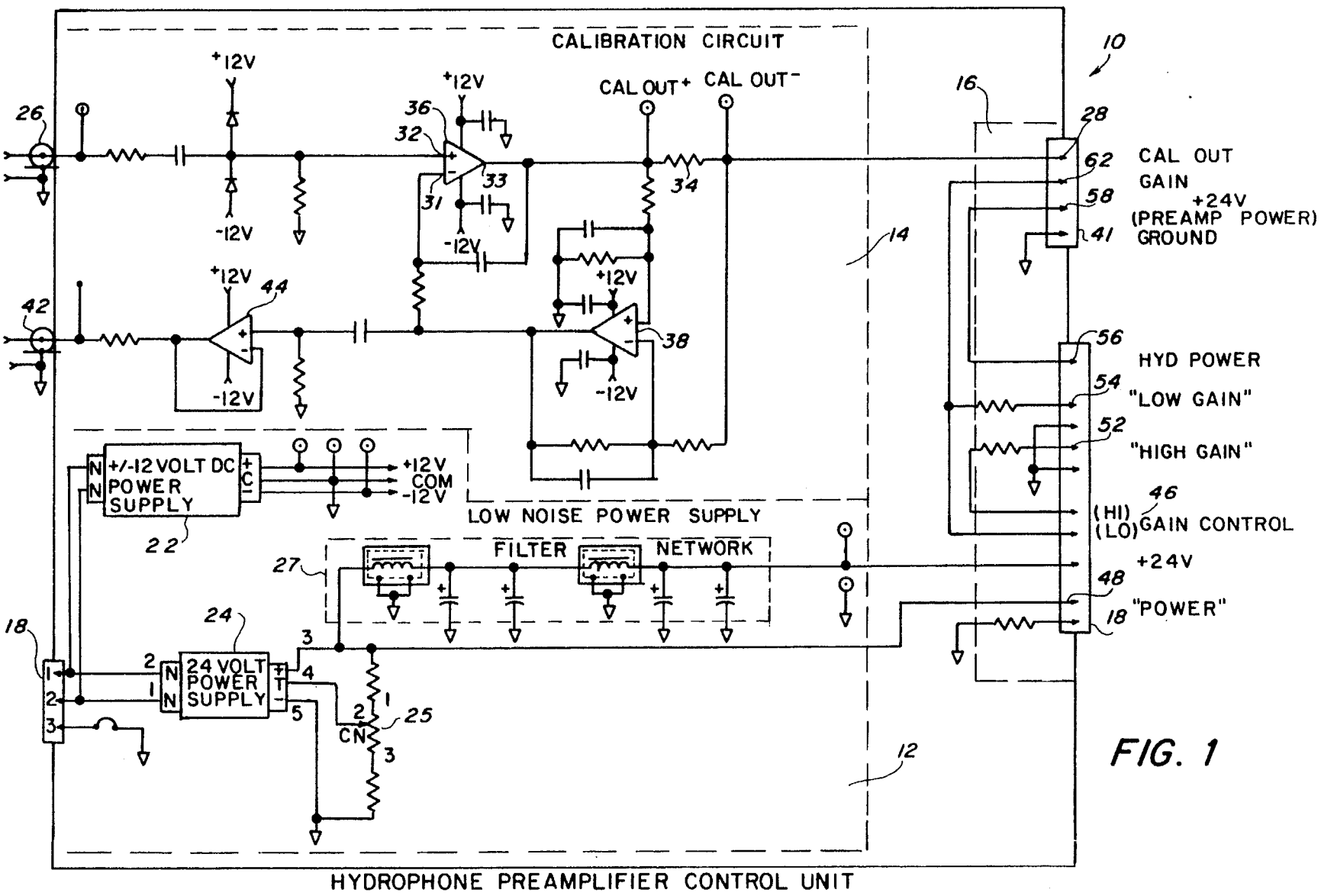
FIG. 1 is a schematic a hydrophone preamplifier control unit.

Referring to FIG. 1, the hydrophone preamplifier control unit 10 is comprised of three sections, a low noise-power supply 12, a calibration circuit 14, and a front panel 16. The hydrophone preamplifier control unit 10 provides the power and control for a remotely located hydrophone (not shown) through an interconnecting cable (not shown).

The power supply 12 is comprised of two separate power sources, 12 volt direct current (vdc) 22 and 24 vdc 24. The 12 vdc power source 22 provides the electrical power to operate the calibration circuit 14 electronics and the 24 vdc power source 24 provides power to the hydrophone preamplifier (not shown). Line power (nominally 115 vdc) is supplied to both power sources 22 and 14 through a connector 18. The 12 vdc 22 and 24 vdc 24 power sources may be any standard rectifier device of the type well known to those practicing in the art, such as a model D12-05 and 24E20, respectively, manufactured by Acopian of Easton, Pa. The 12 vdc power source 22 supplies power directly to the calibration circuit 14, without filtration, however, the output 24 vdc power source 24 is filtered through two inductors, such as a part number 6900-33 manufactured by Caddell-Burns of Mineola, N.Y. The 24 vdc power source 24 may be adjusted over a range through the use of the potentiometer 25. The purpose of this adjustment is to compensate for the voltage losses to the 24 vdc when it passes through the filter network 27.

The calibration circuit 14 calibrates the sensor electronics (not shown). The calibration source, or calibration voltage signal is provided by the user through a calibration input jack 26, such as a BNC receptacle part no. CBJ20 made by Trompeter of Westlake Village, Calif. The calibration source is usually a voltage from 0–5 volt root mean square (vrms) within the desired operational frequency range. The calibration source signal may be generated by a signal generator (not shown), or some similar device, and when processed by the calibration circuit 14, it is converted into a current signal which is applied to the preamplifier (not shown) through pin 1 28 of the output connector 41. Output connector 41, such as a part no. 103361-3 made by AMP of Harrisburg, Pa., consists of five pins, the other outputs are discussed below. The connector 41, besides providing an output for the calibration current 28, also provides connections for the 24 vdc preamplifier power 58 and a gain signal 62 to be discussed below.

For instance, the operator desiring to make measurements in the water at 1 kHz would calibrate the hydrophone (not shown) by applying a one-volt signal at 1 kHz through calibration input jack 26 and the calibration circuit 14 would convert this voltage into a 1 kHz output at one milliampere which is output at pin 1 28 of output jack 32.

The calibration voltage signal is applied through the calibration input jack 26 to a non-inverted input 32 of operational amplifier (opamp) 36 operating as a differential amplifier. The calibration voltage signal is also sensed at the inverted input 31 of opamp 36. At the output 33 of the opamp 36 the amplified voltage passes through a resistor 34, the current formed is applied to the preamplifier (not shown). A feedback loop is also established through opamp 38, also operating as a differential amplifier, which senses the current being generated by the resistor 34 tries to equalized the voltage at the inverted input 31 of opamp 36 to that present on the non-inverted input 32. This feedback of the signal drives the output 33 of the opamp 32 higher and higher until the voltage at the inverted input matches the voltage at the non-inverted input to the opamp 32, at which time the system becomes stable. If the output 33 voltage of the opamp 36 drifts a small amount high or low, there will be a slight fluctuation high or low in the current flowing through the resistor 34 that is representative of the voltage change, this causes the opamp 38 to generate a higher or lower voltage at the inverted input to the opamp 36 and adjust the output 33 to a correct value. The current flowing through the resistor 34 is going to be exactly the same current that is being applied to the preamplifier (not shown). To provide this calibration current from the resistor 34 there must be a complete circuit from the hydrophone preamplifier control unit 10 to the preamplifier (not shown). In a typical application there is approximately one milliampere of current flow through the resistor 34 which is driven by the opamp 36 in response to the illustrative 1 volt at the non-inverted and inverted inputs 31 and 32 of the opamp 36, respectively.

The output current through the resistor 34 is applied to the calibration output monitor jack 42 through a buffer amplifier 44 and allows an operator to monitor, through the use of a readout instrument (not shown), the current being applied to the preamplifier (not shown). The calibration current monitored at the calibration output jack 42 allows the operator to adjust the calibration voltage signal applied through the calibration input jack 26. Further, the operator may sweep the calibration frequency range up to the desired maximum calibration frequency and determine if the desired gain is being supplied by the preamplifier (not shown). If the output level of the preamplifier (not shown) is too high or low, it may be adjusted+ 20 dB or –20 dB by utilizing the gain control switch (not shown) on the front panel of the hydrophone preamplifier control unit 10 which is connected to the electronics through a gain control port 46 of the connector 18.

The calibration circuit 14 will operate effectively up to approximately 50 kHz, even though the operational frequency of the hydrophone (not shown) may be much higher. It is the intention of the calibration circuit to verify to the operator that a continuous circuit exists between the surface and the hydrophone (not shown) underwater. This circuit provides a positive response from the hydrophone (not shown) that a continuous circuit exists.

The connector 18, besides providing inputs for the gain control 46 and on/off switch for the 24 vdc power output 48, has provision for gain indicators 52 and 54, and hydrophone power 56.

It is not the purpose of the calibration circuit 14 to produce a calibration of the frequency responses of the hydrophone (not shown), but merely to provide a degree of confidence to the operator as to the continuity of the system.

What is claimed is:

1. A hydrophone preamplifier control unit comprised of:

a power supply having a 12 volt DC and 24 v DC output;

means for adjusting the 24 volt DC output of the power supply to compensate for losses in the power supply;

means for applying a calibration voltage;

means for generating a calibration current from the applied calibration voltage that is applied to a hydrophone preamplifier; and means for monitoring the calibration current applied to the hydrophone preamplifier.

2. A hydrophone preamplifier control unit, as in claim 1, wherein the means for adjusting the 24 volt Dc output of the power supply is a potentiometer.

3. A hydrophone preamplifier control unit, as in claim 1, wherein the means for applying a calibration voltage is a signal generator.

4. A hydrophone preamplifier control unit, as in claim 1, wherein, the means for monitoring the calibration current applied to the preamplifier is an oscilloscope.

* * * * *